United States Patent
Huis et al.

(10) Patent No.: US 7,273,142 B2
(45) Date of Patent: Sep. 25, 2007

(54) PACKAGING CUSHION DELIVERY SYSTEM

(75) Inventors: Paul Van Huis, Whithall, NY (US);
Kerry McKinley, Newtown, CT (US);
Robert A. White, Jr., Watertown, CT
(US); Michael Charney, Hinesburg, VT
(US)

(73) Assignee: Sealed Air Corporation (US),
Elmwood Park, NJ (US)

( * ) Notice: Subject to any disclaimer, the term of this patent is extended or adjusted under 35 U.S.C. 154(b) by 236 days.

(21) Appl. No.: 10/780,176

(22) Filed: Feb. 17, 2004

(65) Prior Publication Data

US 2005/0178085 A1    Aug. 18, 2005

(51) Int. Cl.
*B65G 47/10* (2006.01)

(52) U.S. Cl. .................. 198/369.2; 198/575; 198/592; 198/436; 242/554.2; 209/657; 83/102; 83/937

(58) Field of Classification Search ............ 198/369.2, 198/360, 575, 592, 436; 242/554.2; 209/657; 83/102, 105, 155, 935, 937
See application file for complete search history.

(56) References Cited

U.S. PATENT DOCUMENTS

| | | | |
|---|---|---|---|
| 238,220 A | | 3/1881 | Davis |
| 2,836,415 A | | 5/1958 | Rohdin |
| 3,817,803 A | * | 6/1974 | Horsky ........................ 156/85 |
| 3,902,954 A | * | 9/1975 | Lotto ........................... 156/510 |
| 4,149,484 A | * | 4/1979 | Koch ........................... 118/42 |
| 4,756,399 A | * | 7/1988 | Scata ........................ 198/369.2 |
| 4,825,622 A | * | 5/1989 | Nigg ........................... 53/203 |
| 4,852,715 A | * | 8/1989 | Kmetz ........................ 198/369.2 |
| 4,921,155 A | | 5/1990 | Ito et al. |
| 4,938,336 A | * | 7/1990 | Aquino et al. ........... 198/369.2 |
| 5,078,255 A | * | 1/1992 | Haley ........................... 198/358 |
| 5,216,868 A | | 6/1993 | Cooper et al. |
| 5,279,195 A | * | 1/1994 | Breton ......................... 83/72 |
| 5,421,446 A | * | 6/1995 | Koch et al. ............. 198/369.7 |
| 5,478,581 A | * | 12/1995 | Christie et al. ............... 426/80 |
| 5,681,035 A | * | 10/1997 | Ifkovits et al. ............... 270/51 |
| 5,732,609 A | * | 3/1998 | Marschke ................... 83/92.1 |
| 5,942,076 A | | 8/1999 | Salerno et al. |

(Continued)

FOREIGN PATENT DOCUMENTS

DE    43 23 566 A1    1/1995

(Continued)

OTHER PUBLICATIONS

Product Brochure, Airfil U.S.A., "Airfil: The flexible approach to air-filled packaging", Jan. 1998.

(Continued)

*Primary Examiner*—Douglas A Hess
(74) *Attorney, Agent, or Firm*—Daniel B. Ruble

(57) ABSTRACT

A system for conveying a string of packaging cushions includes a machine capable of manufacturing the string and a conveyor adapted to transport the string. The conveyor has an inlet end to receive the string and an outlet end to deliver the string of packaging cushions. The inlet end of the conveyor is higher than the cushion outlet elevation of the machine. At least one pair of rolls are adapted to lift the string of packaging cushions from the machine through the nip of the rolls to the conveyor inlet elevation.

22 Claims, 12 Drawing Sheets

U.S. PATENT DOCUMENTS

| | | | |
|---|---|---|---|
| RE36,501 E | 1/2000 | Hoover et al. | |
| 6,061,996 A * | 5/2000 | Vissers et al. | 53/244 |
| 6,419,217 B1 * | 7/2002 | Hartmann et al. | 270/52.12 |
| 6,428,246 B1 | 8/2002 | Landrum | |
| 6,453,644 B1 * | 9/2002 | Baker | 53/403 |
| 6,536,183 B1 | 3/2003 | Brown | |
| 6,550,603 B1 | 4/2003 | Beach et al. | |
| 6,708,813 B2 * | 3/2004 | Takahashi | 198/369.2 |

FOREIGN PATENT DOCUMENTS

| | | |
|---|---|---|
| FR | 2 678 529 | 1/1991 |
| JP | 59086508 | 5/1984 |
| JP | 04331092 A | 11/1992 |
| NL | 1015126 | 11/2001 |
| WO | 02/064358 A2 | 8/2002 |

OTHER PUBLICATIONS

Packaging Magazine, vol. 1, issue 11, "End of Line Joint Effort" p. 14, Jun. 4, 1998.

* cited by examiner

PACKAGING CUSHION DELIVERY SYSTEM

BACKGROUND OF THE INVENTION

The present invention relates to systems for conveying a string of packaging cushions to one or more hoppers.

Packaging dunnage material may be used to fill the void spaces in a box containing a packaged article. One type of packaging dunnage material is air-filled dunnage cushions, which may be provided as a string of air-filled cushions with perforations between cushions. The packer selects the desired number of cushions to be inserted as dunnage in the box, and manually tears the perforations to separate a selected section of cushions from the string.

Businesses that package and ship numerous articles may have several packing stations at which packers insert the dunnage cushions in boxes along with the articles to be packaged. The plant space at which this packaging occurs may be cramped because of the equipment materials used to deliver, package, and ship the articles.

SUMMARY OF THE INVENTION

The present invention may address one or more of the aforementioned problems. In one embodiment, a system for conveying a string of packaging cushions includes a machine capable of manufacturing the string of packaging cushions and a conveyor adapted to transport the string of packaging cushions. The conveyor has an inlet end capable of receiving the string of packaging cushions and an outlet end capable of delivering the string of packaging cushions. The machine defines a manufactured cushion outlet elevation. The inlet end of the conveyor is at an elevation higher than the manufactured cushion outlet elevation. At least one pair of rolls forms a nip. The pair of rolls is adapted to lift the string of packaging cushions from the machine through the nip to the conveyor inlet elevation.

In another embodiment, a machine for separating a string of packaging cushions includes a front pair of rolls comprising an upper front roll and a lower front roll forming a front nip between the upper and lower front rolls. The front nip is adapted to pass the string of packaging cushions through the front nip. A rear pair of rolls comprises an upper rear roll and a lower rear roll forming a rear nip between the upper and lower rear rolls. The rear nip being adapted to pass the string of packaging cushions through the rear nip. A plunger is moveable between an engaged position and a disengaged position. In the engaged position the plunger is between the front and rear pairs of rolls and extends through a line formed between the front and rear nips to separate the string of packaging cushions into a leading string segment and a trailing string of packaging cushions. In the disengaged position the plunger does not extend through the line.

In another embodiment, a machine for lifting and releasing a string of packaging cushions at a desired elevation includes a pulley having a given pulley elevation. A front roller is at an elevation higher than the given pulley elevation. An endless belt encircles the pulley and the front roller. A clip is attached to the belt. The clip is adapted to hold one end of the string of packaging cushions as the string is lifted by the belt to the elevation of the front roller. The clip is adapted to release the string upon application of a given release tension to the clip. A rear roller opposes the front roller and is spaced sufficiently close to the front roller to obstruct the passage of a cushion of the string of packaging cushions between the front and rear rollers. The endless belt and clip are adapted to pass between the front and rear rollers so that the obstruction of the passage of the string of packaging cushions causes the application of the given release tension to the clip to release the string of packaging cushions at the desired elevation.

In another embodiment, a system for conveying a string of packaging cushions comprises a machine capable of manufacturing the string of packaging cushions and a transport conveyor adapted to transport the string of packaging cushions. The transport conveyor has an inlet end capable of receiving the string of packaging cushions and an outlet end capable of delivering the string of packaging cushions. The transport conveyor comprises two or more transport conveyor sections. At least one of the transport conveyor sections is adapted to be moveable between a conveyor-section open position and a conveyor-section closed position. The conveyor-section open position creates an intermediate outlet between the inlet and outlet ends of the transport conveyor and establishes an intermediate flow path for the string of packaging cushions along the transport conveyor from the transport conveyor inlet end through the intermediate outlet. In the conveyor-section closed position the intermediate outlet is closed to establish a primary flow path for the string of packaging cushions past the intermediate outlet location. A rotating member is adapted to cooperate with the transport conveyor to propel the string of packaging cushions from the machine to the transport conveyor inlet end and between the rotating member and the transport conveyor.

Other objects, features and advantages of the present invention will become apparent from the following detailed description of the invention taken in conjunction with the accompanying drawings.

BRIEF DESCRIPTION OF THE DRAWINGS

Like numbers refer to like elements throughout the drawings.

DETAILED DESCRIPTION OF THE INVENTION

Figure 1:
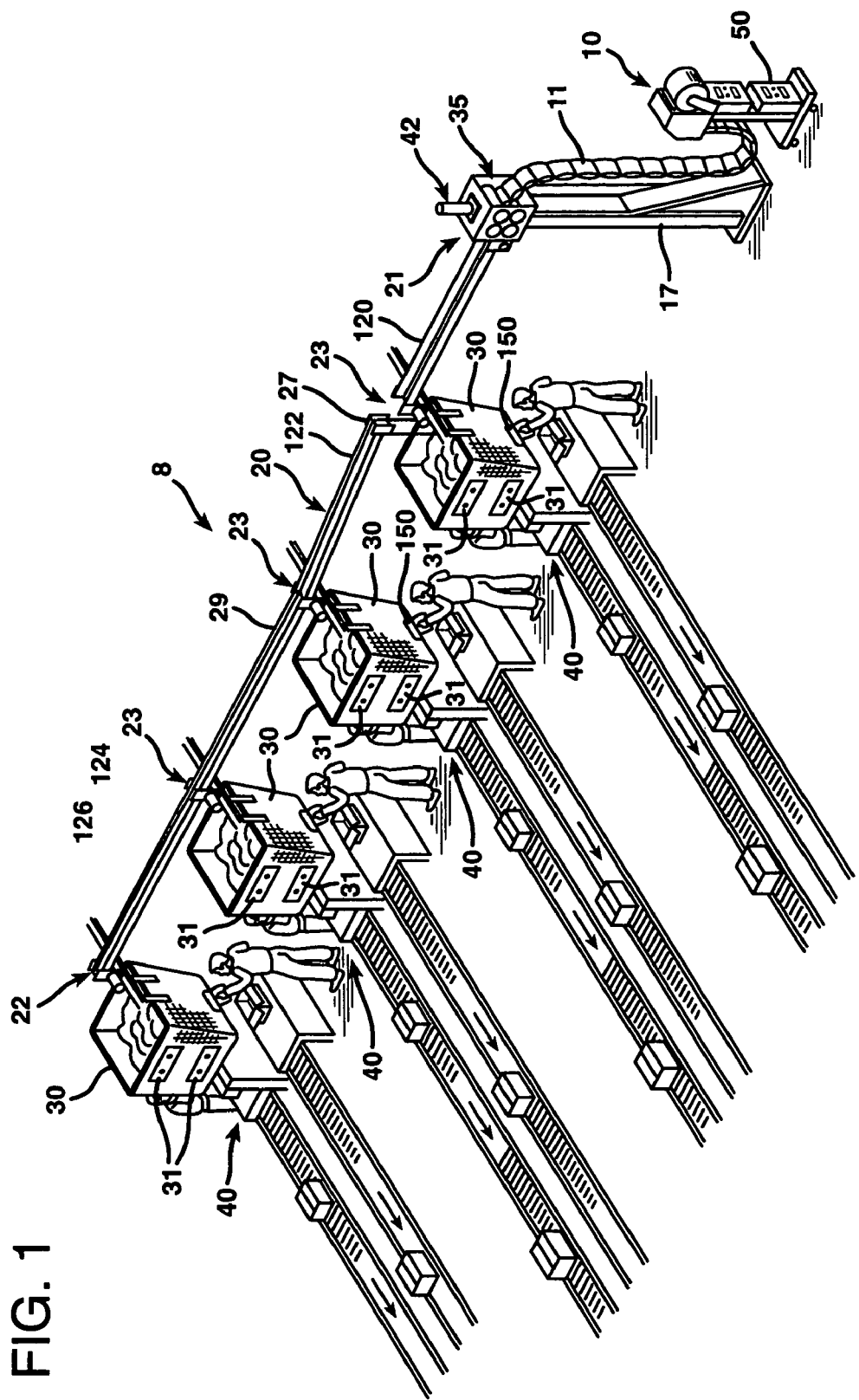
FIG. 1 is a representational perspective view of one embodiment of a system for conveying a string of packaging cushions according to the present invention.
Figure 2:
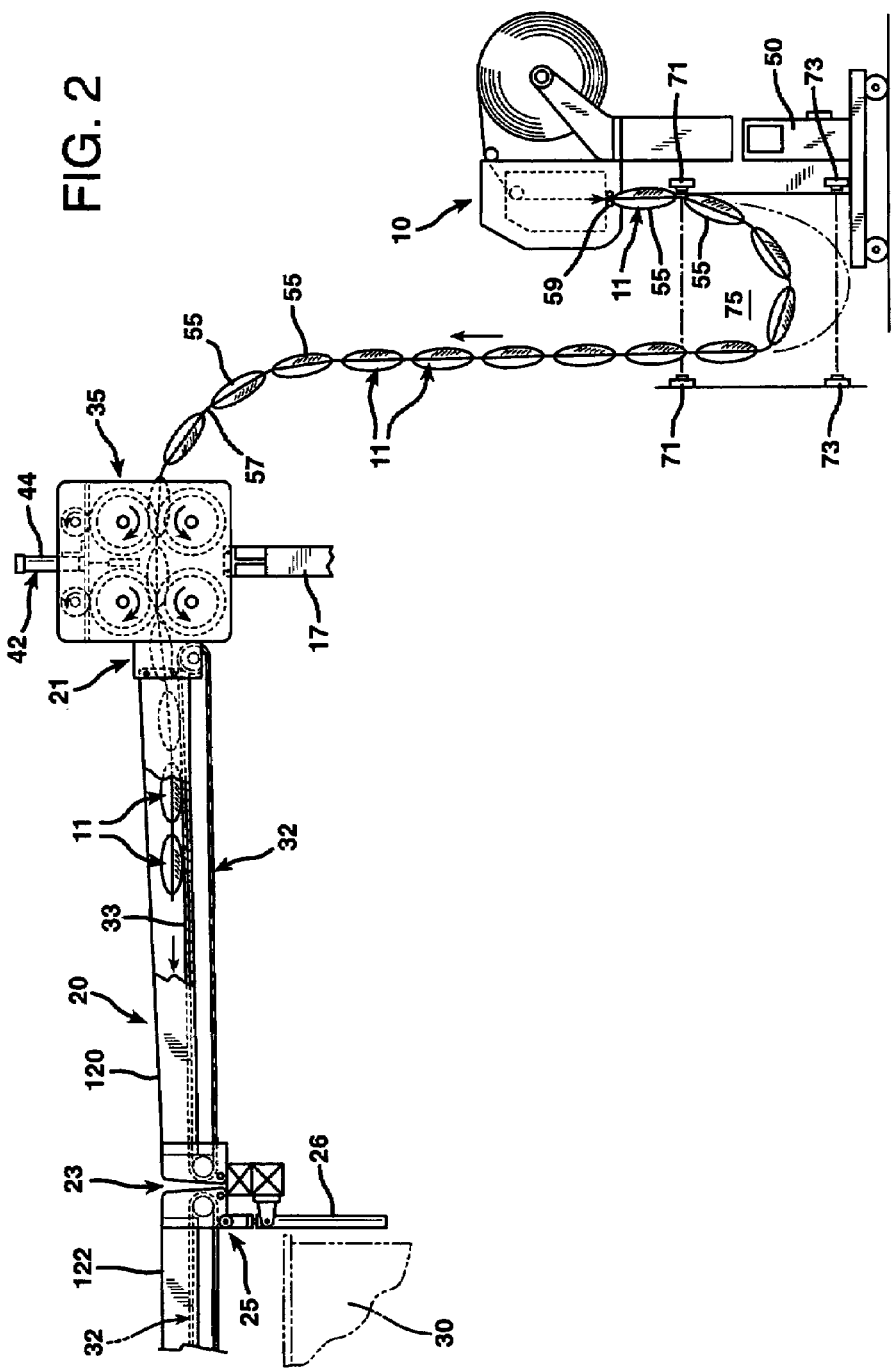
FIG. 2 is a representational fragmentary sectional side elevation view of the system of FIG. 1, but having an intermediate outlet in the closed position.

A system 8 for conveying a string of packaging cushions 11 may comprise one or more of cushion supply machine 10, roll assembly 35, separator 42, conveyor 20, controller 50, loader 80, and hoppers 30. (FIGS. 1-2.)

Cushion Supply Machine

Cushion supply machine 10 is capable of manufacturing and/or supplying the string of packaging cushions 11. (FIGS. 1-2, 8, 10.) Each cushion 55 of the string of packaging cushions is connected to at least one other adjoining cushion of the string. The string of packaging cushions 11 may include perforations 57 (FIG. 6) between adjacent cushions 55 of the string to facilitate separation of the string into string segments or into one or more individual cushions. "Perforations" as used herein includes scoring or other lines of weakening adapted for the purpose of facilitating separation of the string of packaging cushions. The string of packaging cushions may comprise air-filled cushions, foam-filled cushions, as well as cushions comprising other types of packaging materials. Such cushions may be useful in or adapted for packaging dunnage applications. An exemplary string of air-filled dunnage cushions is sold under the Fill-Air 1000® trademark by Sealed Air Corporation.

Machine 10 defines a manufactured cushion outlet elevation 59, which is the elevation at which the creation of each new cushion 55 in a string of packaging cushions 11 is completed by machine 10. An exemplary cushion supply machine 10 for manufacturing the string of packaging cushions 11 is the Fill-Air 1000® machine available from Sealed Air Corporation. Further examples of useful strings of packaging cushions and the machines for making them are disclosed in U.S. Pat. No. 5,942,076 to Salerno, which is incorporated herein in its entirety by reference.

Conveyor

Conveyor 20 is adapted to transport the string of packaging cushions 11. (FIG. 1.) Conveyor 20 defines passageway 128 (FIG. 3) through which the string of packaging cushions 11 may be transported. The conveyor 20 comprises an inlet end 21, which is capable of receiving the string of packaging cushions to the conveyor, and an outlet end 22, which is capable of delivering the string of packaging cushions from the conveyor. The conveyor 20 may comprise one or more intermediate outlets 23 between the inlet and outlet ends. An intermediate outlet 23, when in the open position discussed below, is capable of delivering the string of packaging cushions 11 from the conveyor.

The conveyor inlet end 21, and optionally the entire conveyor 20, may be at an elevation higher than the manufactured cushion outlet elevation 59, for example, higher than the manufactured cushion outlet elevation 59 by at least about any of the following values: 4 feet, 5 feet, 6 feet, 8 feet, 9 feet, and 10 feet.

Figure 3:
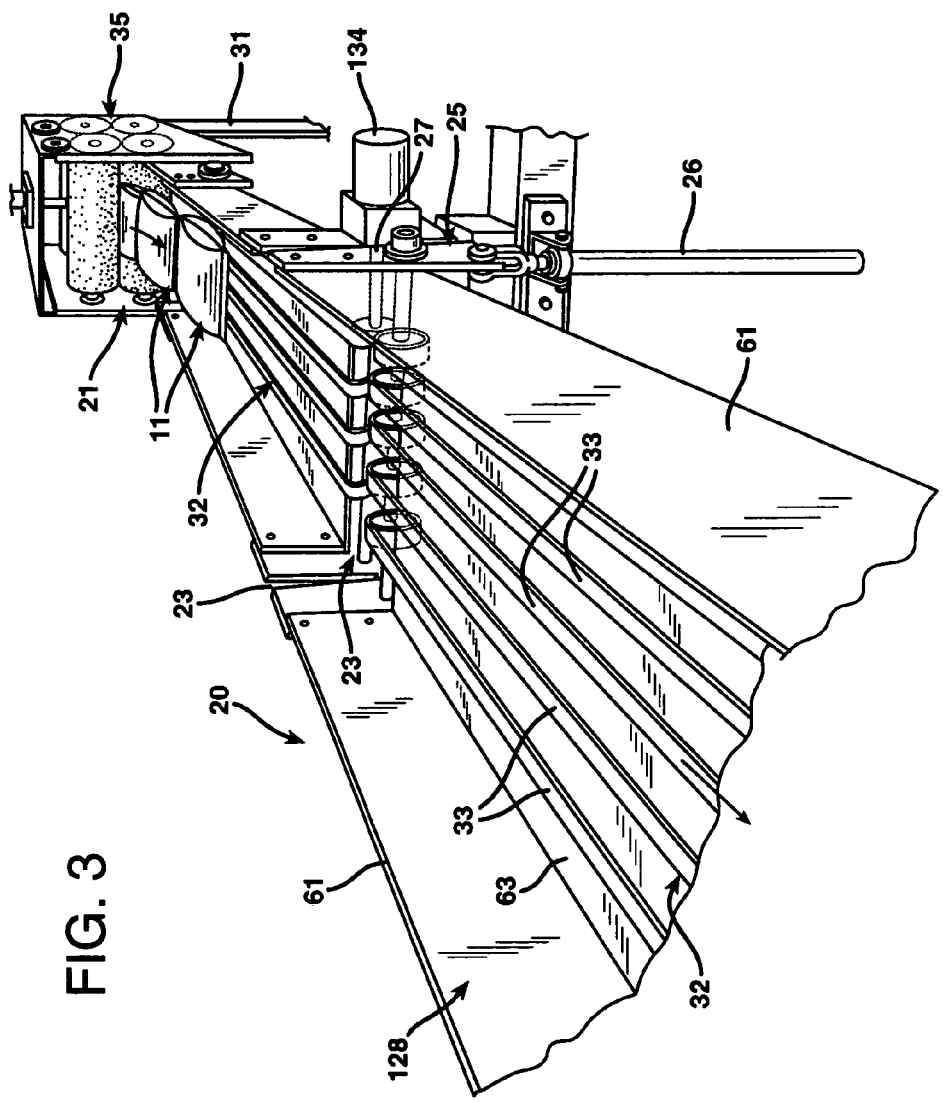
FIG. 3 is a representational fragmentary perspective view of the system of FIG. 2 having an intermediate outlet in the closed position.

The conveyor 20 may comprise one or more conveyor sections, for example two or more conveyor sections, three or more conveyor sections, and four or more conveyor sections, such as conveyor sections 120, 122, 124, and 126 (FIG. 1). The conveyor 20 and/or one or more of the conveyor sections, may comprise conveyor side walls 61 on either side of conveyor bottom wall 63, for example, to form a channel configuration for the conveyor and passageway 128. (FIG. 3.) The passageway 128 formed by the conveyor may not be enclosed, for example, as illustrated in FIG. 3. Alternatively, the passageway 128 may be enclosed for example, by an additional conveyor top wall (not shown) extending between the opposing side walls 61 and above conveyor bottom wall 63, or, for example, as in a duct or tube configuration (not shown).

Figure 4:
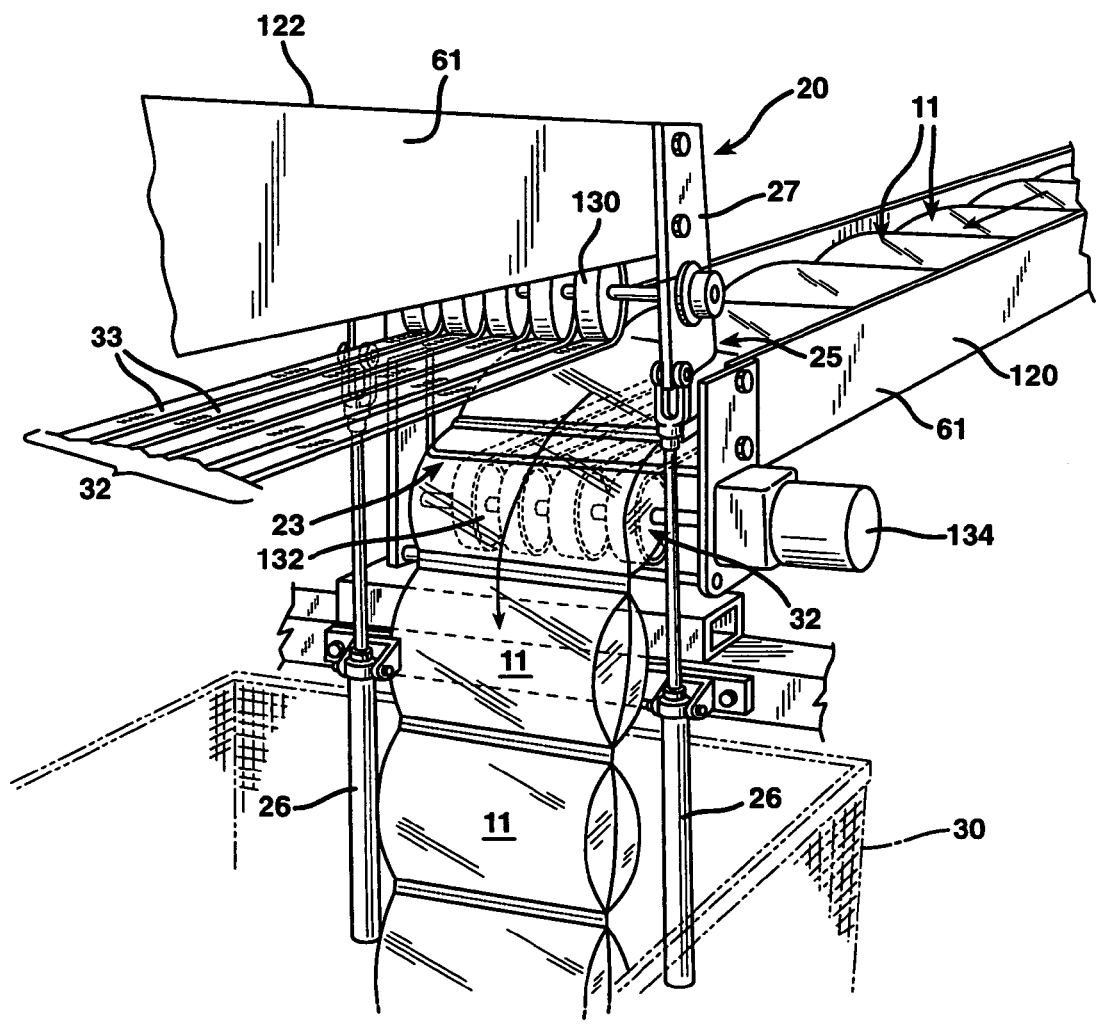
FIG. 4 is a representational fragmentary perspective view of the system of FIG. 1.

The conveyor 20 and/or the conveyor sections may comprise one or more front pulleys 130, one or more rear pulleys 132 downstream from the front pulleys, and drive motor 134. (FIGS. 3-4.) The conveyor 20, and/or each conveyor section (e.g., 120, 122, 124, 126), may comprise at least one endless conveyor belt 32, which may comprise one, one or more, two, two or more, or a plurality of individual endless conveyor belts 33 in parallel configuration. (FIGS. 3-4.) The at least one conveyor belt 32 may be positioned at least partially in the passageway 128 defined by conveyor 20, and may extend around both the one or more front and rear pulleys.

The surface of the conveyor belts 33 may comprise one or more materials that enhance the tackiness or friction between the string of packaging cushions and the belts to assist the transport of the string of packaging cushions that may rest on the conveyor belts. Such materials include rubber and other elastomers. The surface of the belt may be formed by a coating of such materials. An exemplary belt material is Tigon tubing.

Figure 7:
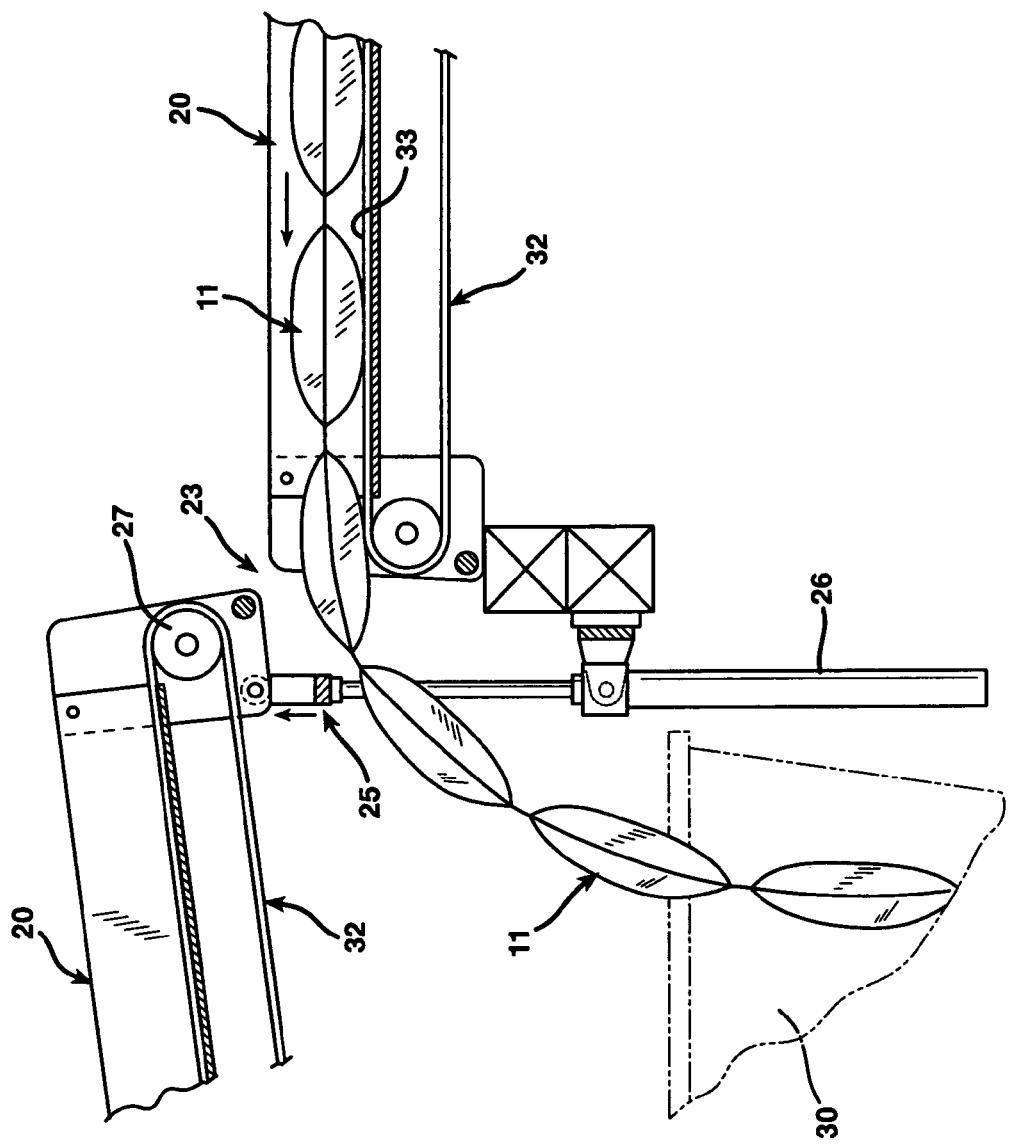
FIG. 7 is a representational fragmentary side elevation view of the system of FIG. 1.

A conveyor section may be moveable to form a corresponding intermediate outlet 23. For example, one or more, two or more, and three or more of the conveyor sections may be moveable to form corresponding intermediate outlets. A moveable conveyor section may be moveable between a conveyor-section closed (in-line) position (FIGS. 2-3 and 5), in which the string of packaging cushions passes the corresponding intermediate outlet in the closed position, and a conveyor-section open position (FIGS. 4 and 7), which creates a corresponding open intermediate outlet 23. For example, moveable conveyor section 122 is in the conveyor-section open position in FIGS. 1 and 4 to establish a first intermediate flow path for the string of packaging cushions 11 in the conveyor passageway 128 from the inlet end 21 through the open intermediate outlet 23. Moveable conveyor section 122 is in the conveyor-section closed position in FIGS. 2-3 to establish a flow path for the string of packaging cushions 11 from the inlet end past the closed (in-line) intermediate outlet.

If each of the moveable conveyor sections 122, 124, and 126 are in the conveyor-section closed position so that each of the intermediate outlets 23 is in the closed position, then a primary flow path may be established for the string of packaging cushions 11 from the inlet end 21 along the conveyor passageway past the positions of each of the closed intermediate outlets 23 and through outlet end 22.

One or more diverters 25 may be adapted to move a corresponding moveable conveyor section. (FIGS. 3-4.) Diverter 25 may move at least one portion or end of a moveable conveyor section (e.g., upstream portion 27 of conveyor section 122) out of alignment with the other conveyor sections to create the corresponding intermediate outlet 23. The opposing end of the diverted conveyor section (e.g., downstream portion 29 of conveyor section 122, FIG. 1) may be hingedly or rotatably supported so that it may not significantly change elevation when the opposing end is moved out of alignment (e.g., upstream end 27 is raised). (FIG. 1.) Thus, a conveyor section may be raised and lowered like a drawbridge to create an intermediate outlet 23. Alternatively, a conveyor section may be moved out of alignment by moving the section to a side (not shown) or down (not shown) to create an intermediate outlet.

The upstream end 27 may be moveable to create a corresponding intermediate outlet 23, for example, by raising or lowering the upstream end. The downstream end 29 may be moveable to create a corresponding intermediate outlet 23, for example, by raising or lowering the downstream end. An intermediate outlet 23 may be created by a movement of the upstream end of one conveyor section and the downstream end of an adjacent conveyor section.

The diverter 25 may be positioned by pistons or air cylinders 26, which may be activated and/or controlled by controller 50, for example, by one or more signals. Thus, the position of the diverter and its corresponding conveyor section may be control or determined by the controller 50 (discussed below).

Roll Assembly

The string of packaging cushions 11 may be moved to conveyor 20 by passing the string of packing cushions 11 through roll assembly 35, which may be located adjacent inlet end 21 of the conveyor 20. (FIGS. 1-3, 5-6.) The roll assembly 35 may be supported by frame 17.

Figure 5:
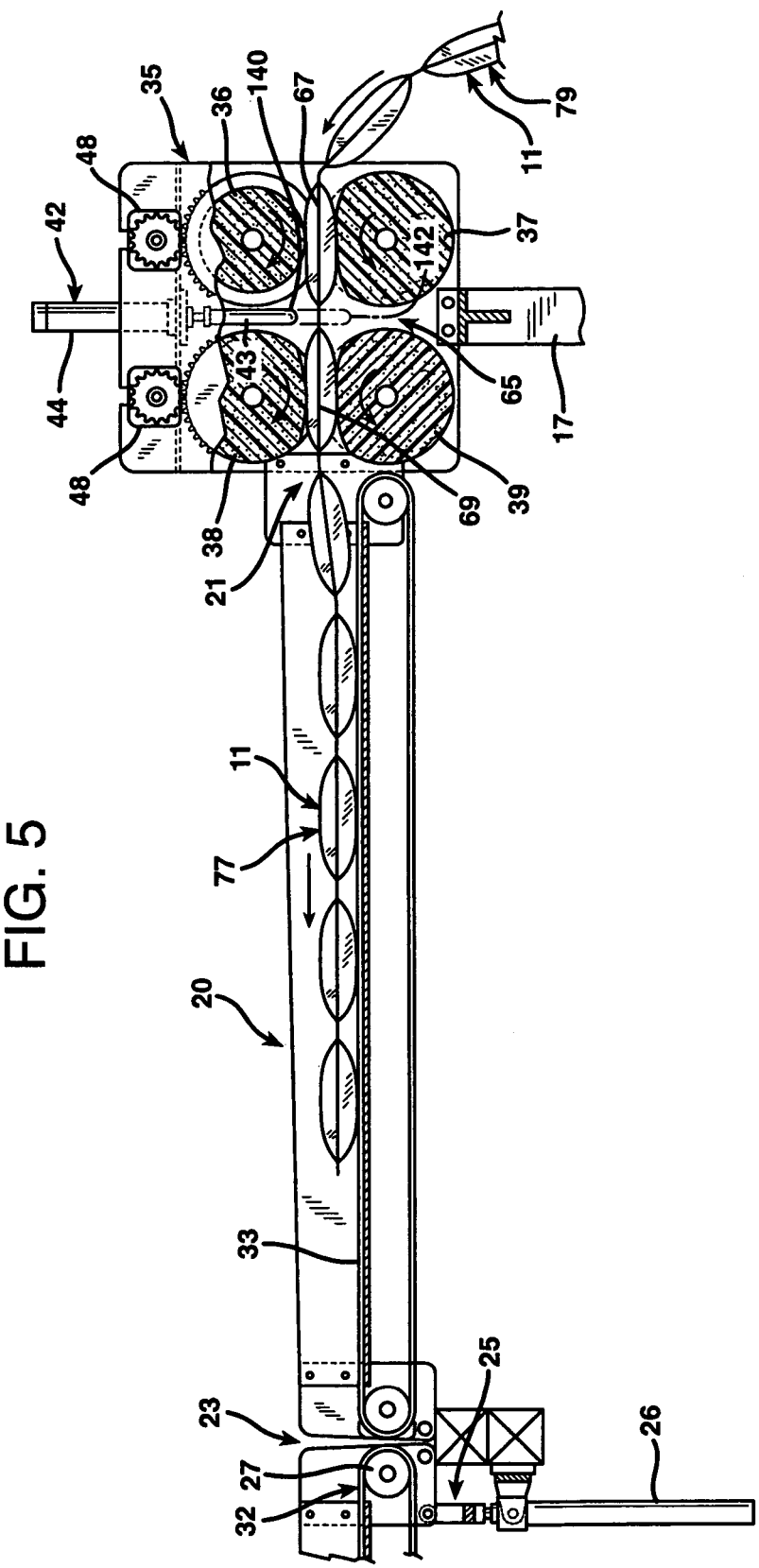
FIG. 5 is a representational fragmentary sectional side elevation view of the system of FIG. 2.

The roll assembly 35 may comprise a first or front pair of rolls comprising top roll 36 and bottom roll 37 forming a front nip 67 between the top and bottom rolls. (FIG. 5.) The front pair of rolls may be adapted to lift the string of packaging cushions 11 from the machine through the front nip 67 to the conveyor 20 (e.g., to the elevation of conveyor inlet 21).

The roll assembly 35 may comprise a second or rear pair of rolls downstream from the front pair of rolls 36, 37, the rear pair of rolls comprising top roll 38 and bottom roll 39, which cooperate to form rear nip 69 between the top and bottom rolls. (FIG. 5.) The rear pair of rolls may be adapted to pass the string of packaging cushions 11 through the rear nip 69 as "nip" as used herein may be considered as the space between a pair of counter-rotating members where incoming material such as the string of packaging cushions may be drawn between the rotating members.

A gap region 65 may exist between the front nip 67 and rear nip 69. (FIG. 5.) The rear nip 69 may be no farther from the front nip 67 than any of the lengths of three, two, or one of the cushions 55 of the string of packaging cushions 11.

One or both of the rolls of the front and/or rear pairs of rolls may be adapted to deform as a cushion 55 of the string of packaging cushions passes through the corresponding front and rear nips 67, 69. One or both of the rolls of the front and/or rear pairs of rolls may comprise resilient foam, such as foam comprising polyester or polyurethane. The density of the foam may range from about 1.5 lbs/ft3 to about 2 lbs/ft3. The top roll of a pair of rolls may comprise a first foam and the bottom roll of a pair of rolls may comprise a second foam. The first foam may be more dense than the bottom roll; or the first foam may be less dense than the second foam.

The rear pair of rolls may be adapted to rotate at a desired or selected time at a speed slightly faster than the rotational speed of the front pair of rolls, for example, in order to tension the string of packaging cushions in the gap region 65. This increased tension may be useful in selectively separating the string of packaging cushions 11 at perforations 57 within the gap region 65. The increased tension may be useful during the engagement of the separator (discussed below). The tension may also be useful to reduce the likelihood of the string of packaging cushions from bunching up in the gap region. The rotational speed of the driven rolls (shown as top rolls 36 and 38) may be controlled independently by motors 48, which may receive one or more control signals from the system controller 50. Each nip roll (shown as bottom rolls 37 and 39 in FIG. 5) may be driven by a gear in cooperation with a gear attached to the corresponding driven roll.

Lift Conveyors

Figure 9:
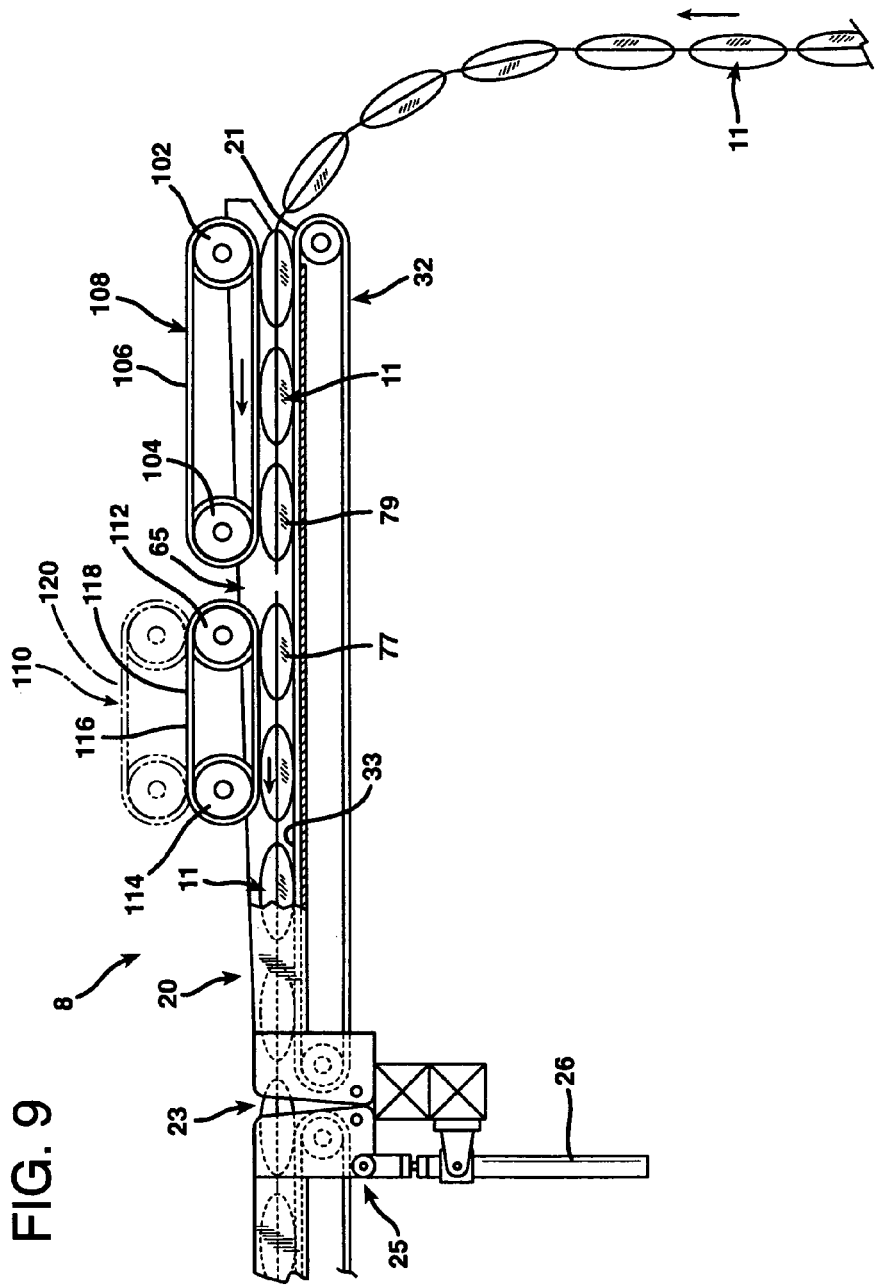
FIG. 9 is a representational fragmentary sectional side elevation view of another embodiment of a system for conveying a string of packaging cushions according to the present invention.

Turning to FIG. 9, the system 8 may comprise a top lift roll 102, which may be adapted to oppose and cooperate with conveyor 20 to pass the string of packaging cushions 11 between the top lift roller 102 and the conveyor 20 to lift the string of cushions from the manufactured cushion outlet elevation 59 of machine 10 to the inlet end 21 of conveyor 20, which may be at an elevation higher than the outlet elevation 59 of machine 10, as discussed above. The top lift roll 102 may oppose conveyor 20 to form a nip therebetween adapted to pass the string of packaging cushions 11.

Downstream lift roll 104 may be downstream from top lift roll 102. (FIG. 9.) Endless belt 106 may encircle top lift roll 102 and downstream roll 104 to form first top conveyor 108. First top conveyor 108 may be adapted to oppose and cooperate with conveyor 20 to form a constricted passageway through which to propel the string of packaging cushions 11 between the top lift conveyor 108 and the conveyor 20 in order to lift the string of cushions from the manufactured cushion outlet elevation 59 of machine 10 to the inlet end 21 of conveyor 20, which may be at an elevation higher than the outlet elevation 59 of machine 10.

Second top conveyor 110 may be downstream from first top conveyor 106. (FIG. 9.) Second top conveyor may comprise upstream separator roll 112, downstream separator roll 114, and second top conveyor endless belt 116 encircling the rolls 112 and 114. The second top conveyor may be moveable between: a) an engaged position 118, in which the second top conveyor 110 opposes and cooperates with conveyor 20 to form a constricted passageway through which to propel the string of packaging cushions 11 between the second top conveyor 110 and the conveyor 20, and b) a disengaged position, in which the second top conveyor 110 is spaced apart from the bottom conveyor 20 to not contact the string of packaging cushions 11 being transported by conveyor 20.

The first and second top conveyors 108, 110 may define gap region 65 between the first and second top conveyors. The second top conveyor 110 in the engaged position 118 may be adapted to rotate at a speed faster than the rotational speed of the first top conveyor 108 to tension the string of packaging cushions in the gap region 65 and separate the string of packaging cushions 11 into a leading string segment 77 and a trailing string of packaging cushions 79. (FIG. 9.)

Figure 8:
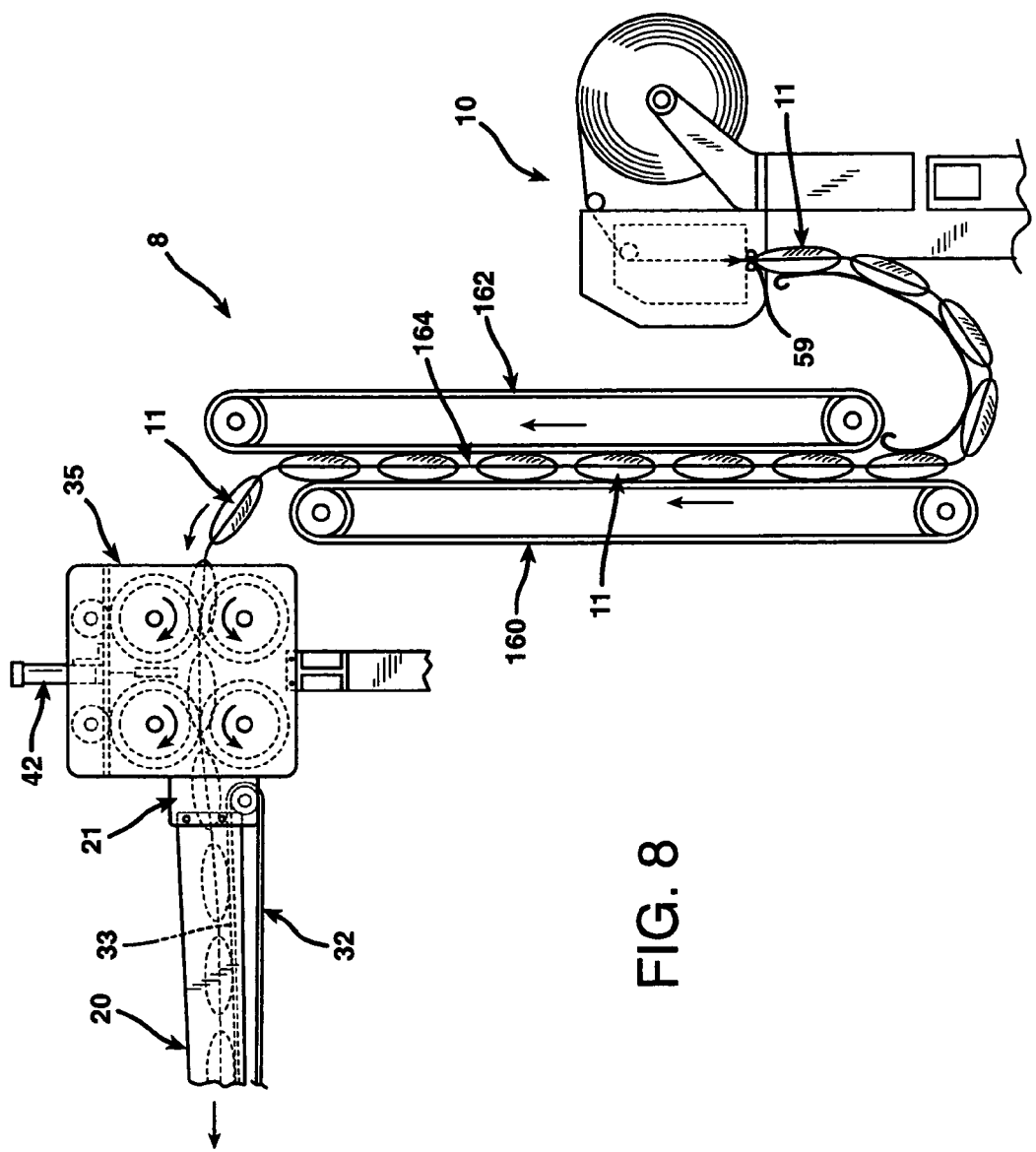
FIG. 8 is a representational fragmentary sectional side elevation view of another embodiment of a system for conveying a string of packaging cushions according to the present invention.

Turning to FIG. 8, left conveyor 160 and right conveyor 162 cooperate to form a lifting passageway 164 adapted to propel the string of packaging cushions 11 between the left conveyor 160 and the right conveyor 162 and to lift the string of cushions from the manufactured cushion outlet elevation 59 of machine 10 to about the elevation of inlet end 21 of conveyor 20, which may be at an elevation higher than the outlet elevation 59 of machine 10.

Separator

Figure 6:
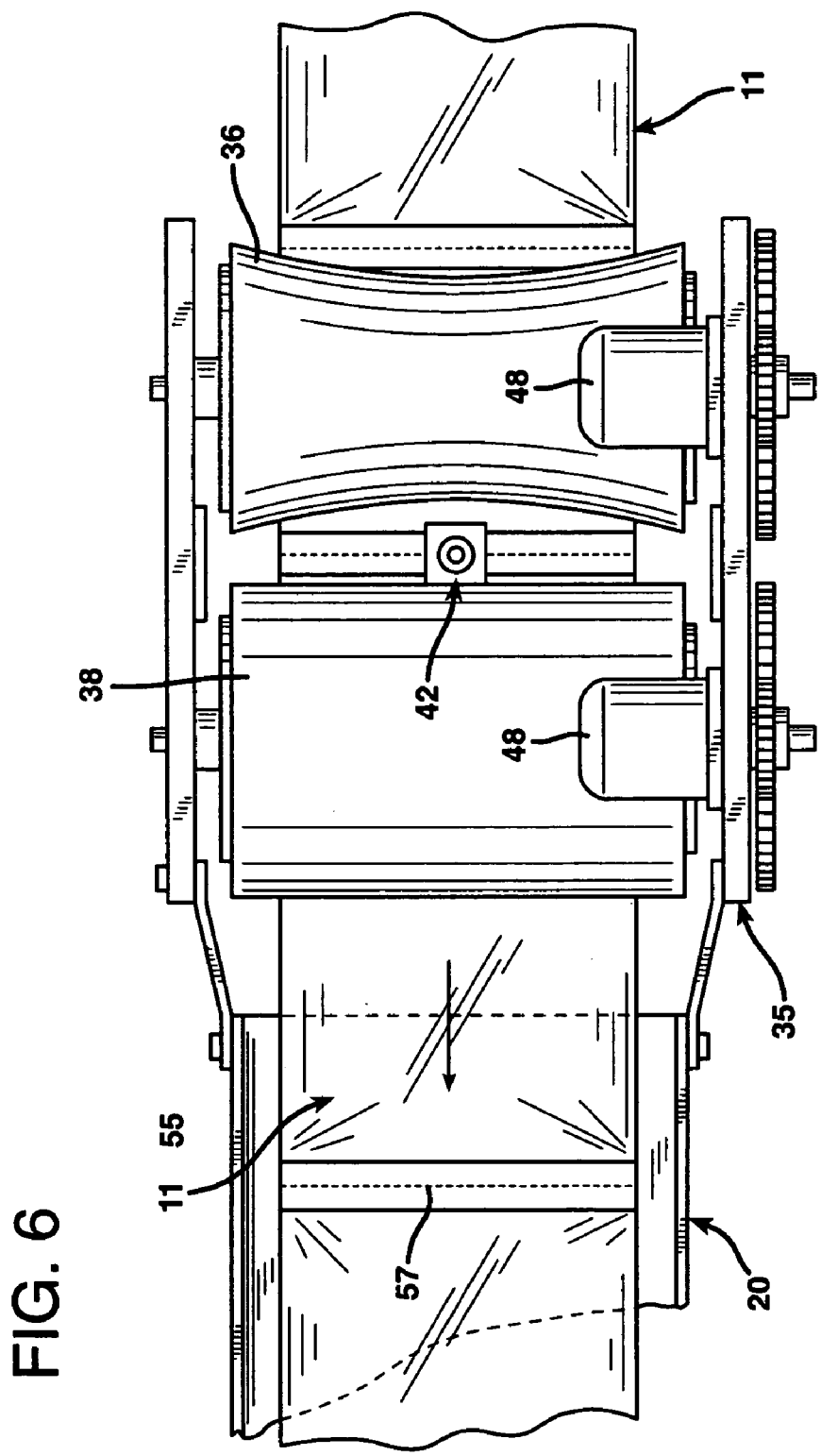
FIG. 6 is a representational fragmentary top plan view of the system of FIG. 5.

Separator or plunger 42 is adapted to separate the string of packaging cushions to selected or desired lengths. Separator 42 comprises actuator 44 and plunger member 43, which may be driven by actuator 44, which in turn may be controlled by one or more signals from controller 50. The separator or plunger 42 may be moveable between: a) an engaged position 142, in which the plunger member 43 is positioned between the front pair of rolls 36, 37 and the rear pair of rolls 38, 39 and extends through a line formed from the front nip 67 to the rear nip 69, and b) a disengaged position 140, in which the plunger member 43 does not extend past this line. (FIGS. 5-6.) In the engaged position 142, the plunger 42 may be adapted to separate the string of packaging cushions 11, for example, in the gap region 65. The plunger member 43 may comprise a blunt end, as illustrated in the drawings, or a sharp end (not shown) for engaging and separating the string of packaging cushions.

Hoppers

One or more hoppers 30 may correspond to the outlet end 22 and each of the intermediate outlets 23 of conveyor 20. The hoppers 30 are adapted to store strings of packaging cushions 11. Hoppers 30 may be located below the conveyor 20 and may be elevated above a packing station 40, for example, elevated to about shoulder height to facilitate access. The hoppers or bins 30 may comprise a mesh basket to hold the cushions 11. Hoppers 30 may comprise one or more openings 150 through which a packing operator may withdraw at least a portion of the string of packaging cushions. (FIG. 1.)

Controller

The controller 50 may receive and send the various status, activation, and control signals described herein. Input/output connections and signal transmission lines between the controller 50 and the various sensors and controlled devices are not shown but are known to those skilled in the art.

The controller 50 may comprise a programmable logic controller ("PLC"). The controller 50 may comprise one or more of a: 1) central processing unit ("CPU"), for example, comprising a microprocessor, to control the functions and operations of the controller, 2) a read only memory ("ROM"), for example, to store data and program code, and 3) a random access memory ("RAM"), for example, to provide a work area and a storage area. The controller may also comprise various input/output (I/O) interfaces for receiving and sending signals, and other storage, display, and peripheral devices as are known in the art. The controller 50 may also store and execute software control program code for carrying out the various control and monitoring functions described herein.

The system 8 may comprise one or more sensors adapted to detect the presence or absence of an object (such as a string of packaging cushions) and send a corresponding status signal to controller 50. A sensor may comprise one or more of a photo-eye, an electric-eye, a photo-detector, and a corresponding reflector. Such sensors and their operation are known to those of skill in the art.

For example, upper sensor 71 and lower sensor 73 (FIG. 2) may be used to define a slack region 75 for the string of packaging cushions between the elevations of the upper and lower sensors 71, 73. The upper and lower sensors 71, 73 may send a status signal to controller 50, which may use that information to control one or more of: 1) the rotational speed or the on/off status of one or more of the front and rear pairs of rolls of the roll assembly 35 in order to adjust the amount of slack in the string of packaging cushions between the machine 10 and the roll assembly 35 and 2) the manufacturing speed or on/off status of supply machine 10.

Also by way of example, one or more hopper sensors 31 may be positioned in conjunction with a hopper to indicate whether the level of cushions in the hopper is above or below a desired level. (FIG. 1) The sensors may send a signal to the controller 50 regarding the status (e.g., full/empty status) of a hopper.

The controller 50 may be adapted to control the operation of the separator 42 and at least one moveable conveyor section in coordinated sequence to deliver the string of packaging cushions along a desired primary or intermediate flow path. The controller 50 may also be adapted to control the operation of the front and rear pair of rollers 36, 37, 38, 39 in coordinated sequence with the operation of the separator 42 and the at least one moveable conveyor section.

For example, the controller 50 may activate the positioning of each conveyor section in either an "open" position or a "closed" position, and may also control the plunger member 43 of separator 42 between a disengaged and an engaged position to form a leading string segment of cushions 77 and a trailing string of packaging cushions 79, in coordinated sequence to deliver the leading and trailing string portions 77, 79 along the flow path desired for each. By way of further example, the controller 50 may be adapted to generate and send one or more of: 1) a conveyor-section open signal to move at least one moveable conveyor section to the conveyor-section open position, 2) a conveyor-section close signal to move the at least one moveable conveyor section to the conveyor-section closed position, and 3) a plunger-engagement signal to move the separator 42 to the engaged position 142. Further, the controller may be adapted to generate and send these signals in coordinated sequence so that a desired intermediate outlet 23 is created or closed in time for a trailing string of packaging cushions 79 to travel a selected or desired primary or intermediate flow path.

The controller 50 may receive signals from the hopper sensors 31 to identify which hoppers have cushions below a desired level (and thus need to be filled) and which hoppers have a level of cushions at or above a desired level (and thus do not need to be filled). The controller may be programmed to control the system to fill the hoppers essentially at an even pace, and/or may prioritize which of the hoppers are to be filled at a given instance depending on the current relative levels of cushions in the hoppers. Thus, the controller may be programmed to control the system to establish a continuously updated priority queue for filling the hoppers based on the relative levels of cushions in the hoppers.

The controller 50 may generate signals to the diverters 25 and the separator 42 to control the diverters and separator in a coordinated sequence so that plunger member 43 separates the string of packaging cushions before the diverter 25 adjusts a corresponding conveyor section from one position to the other, for example to create an intermediate outlet 23 through which the "newly created" string segment of cushions may travel. The string segment may either fall between the open conveyor sections to fill the selected bin, or continue downstream and past the conveyor sections that are in-line.

The controller 50 may also send a signal to control the start and stop of the cushion supply machine 10 in coordinated sequence with the separator 42, so that the movement of the string of packaging cushions may be stopped or slowed while the string is separated. The controller 50 may also receive status signals from the upper and lower slack sensors 71, 73; and in response, the controller may send a signal to control the rotational speed or the on/off status of one or more of the front and rear pairs of rolls of the roll assembly 35, for example, by sending a signal to control the motors 48. The controller 50 may also control the rotational speed of one or more of the conveyor sections.

Loader

Figure 10:
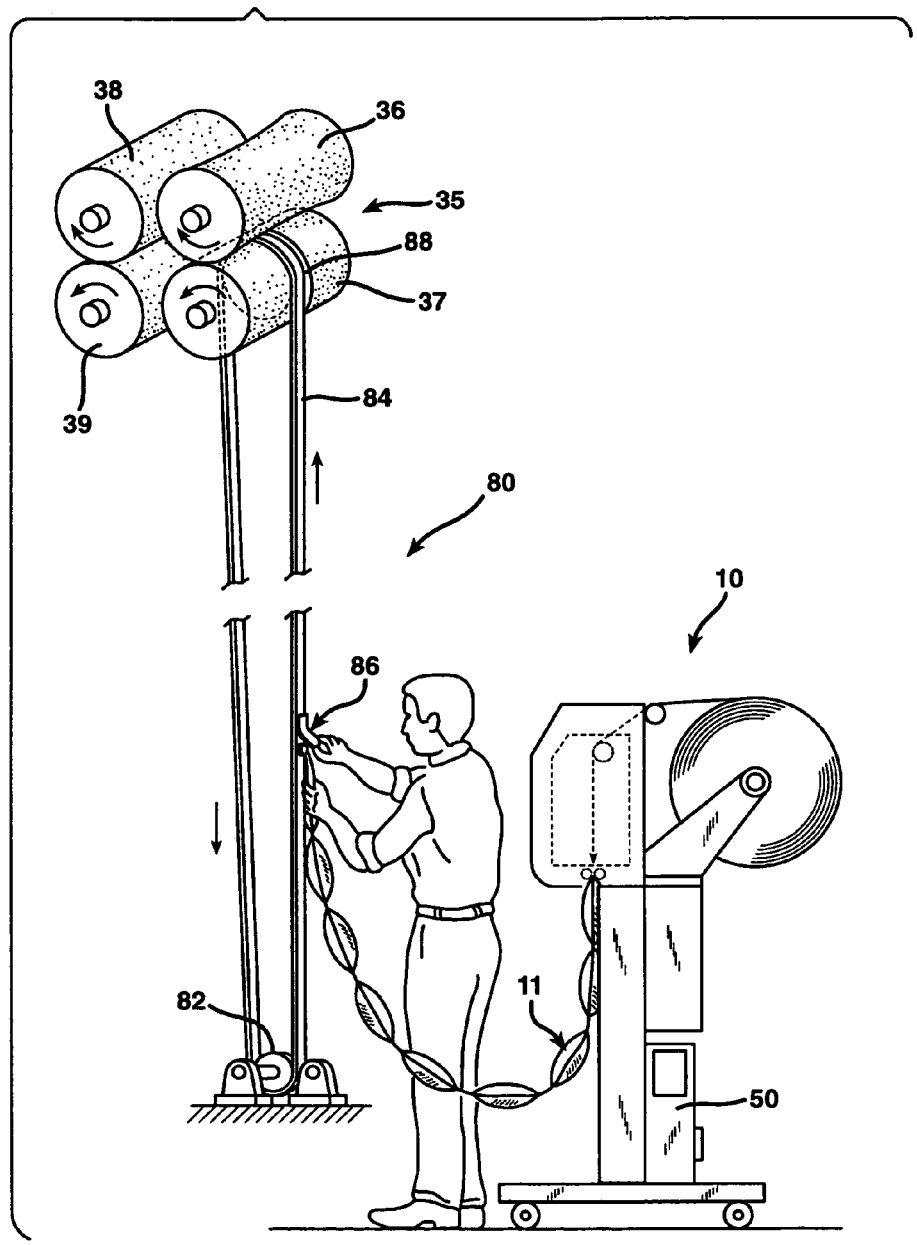
FIG. 10 is a representational perspective view of an embodiment of a system for lifting a string of packaging cushions according to the present invention.
Figure 11:
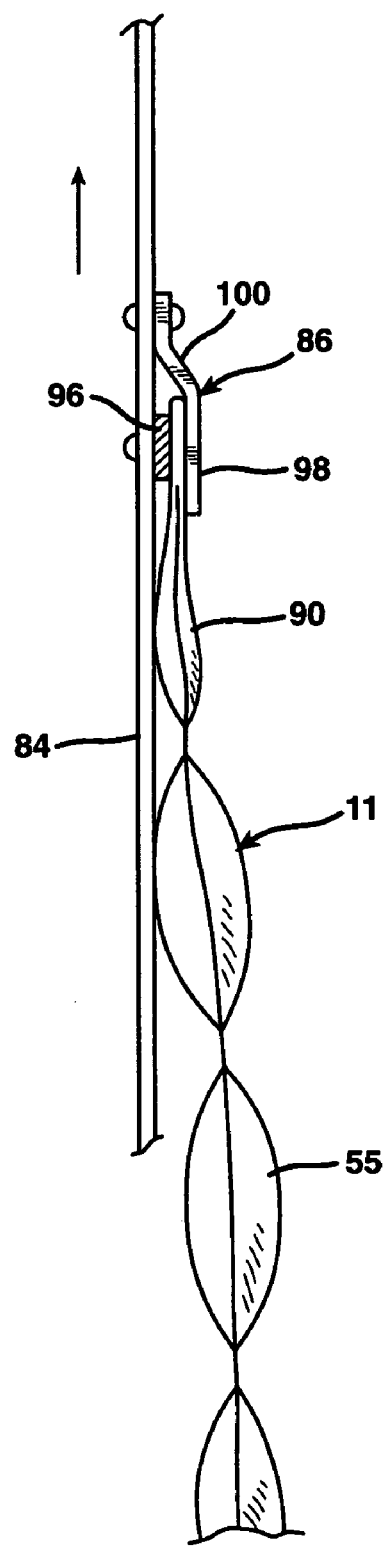
FIG. 11 is a representational fragmentary side elevation view of the clip of FIG. 10.
Figure 12:
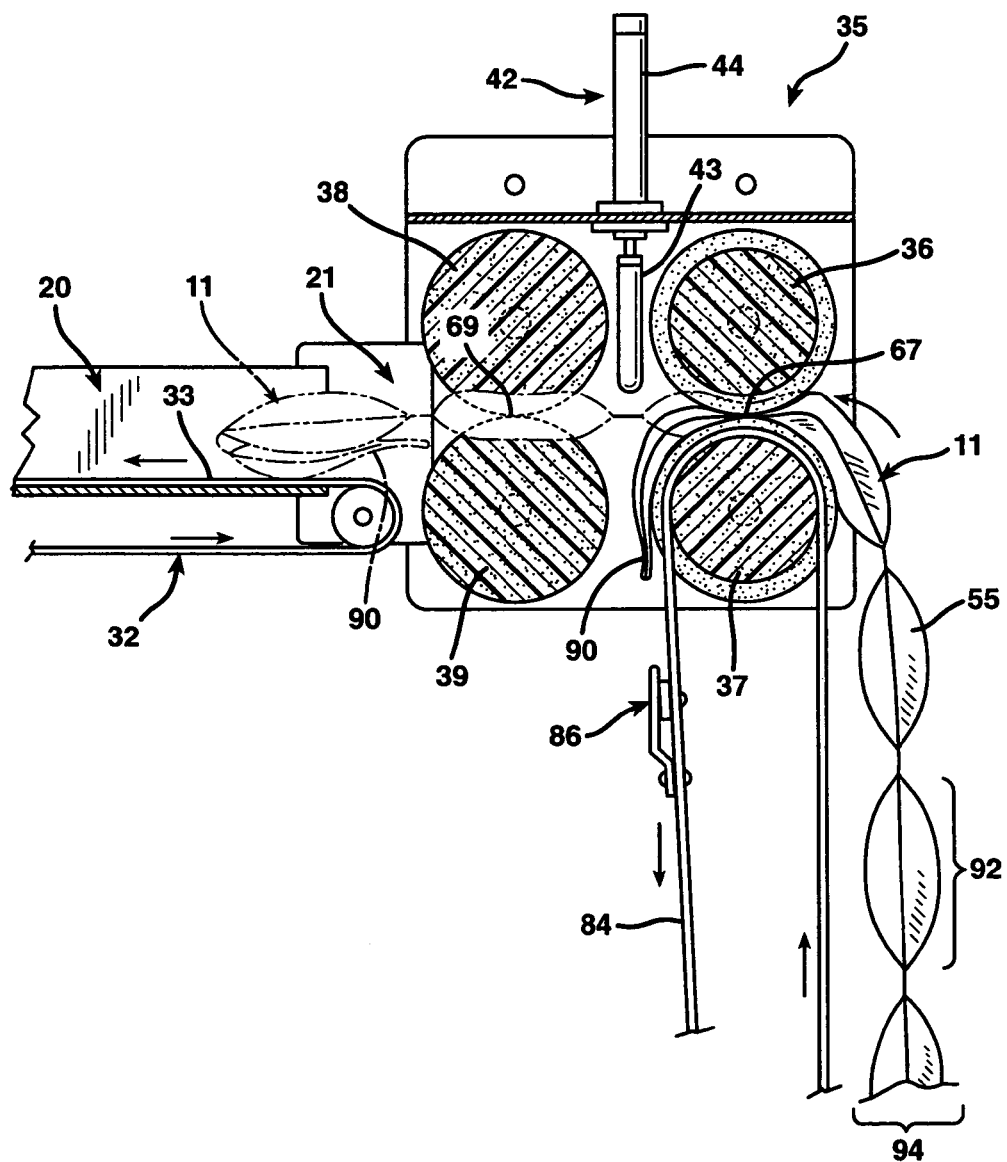
FIG. 12 is a representational fragmentary side elevation sectional view of an embodiment of a system for conveying a string of packaging cushions according to the present invention.

Loader 80 comprises a machine for lifting and releasing a string of packaging cushions at a desired elevation. The loader 80 may comprise one or more of a base pulley 82, a front roller 37, rear roller 39, a top roller 36, an upper roller 38, an endless loader belt 84, and clip 86. (FIGS. 10-12.)

The base pulley 82 is at a given pulley elevation. The front roller 37 is at an elevation higher than the base pulley elevation. The endless belt 84 encircles the base pulley 82 and the front roller 37. The endless belt 84 may comprise a wire or rope. The front roller 37 may define a groove 88 around the circumference of the front roller 37. The endless belt may be within the groove 88 of the front roller 37.

The clip 86 is attached to the belt 84. The clip 86 is adapted to hold one end of the string of packaging cushions 11 as the string is lifted by the belt 84 to the elevation of the front roller 37. The clip 86 is also adapted to release the string upon application of a given release tension to the clip 84. The clip 86 may be adapted to fit within the groove 88. (FIG. 10.)

The rear roller 39 may oppose the front roller 37, and may be spaced sufficiently close to the front roller 37 to obstruct the passage of a packaging cushion 55 between the front and rear rollers, while allowing the passage between the front and rear rollers of one or more of the belt 84, the clip 86, and the deflated cushion 90. For example, the surface of the rear roller 39 may be no farther from the surface of the front roller 37 than any of the length 92 of cushion 55, half the length of cushion 55, and the maximum height 94 of cushion 55 of the string of packaging cushions 11. (FIG. 12.)

The endless belt 84 and clip 86 may be adapted to pass between the front and rear rollers 37, 39 so that the obstruction of the passage of a cushion 55 of the string of packaging cushions 11 causes the application of the given release tension to the clip 84 to release the string of packaging cushions 11 at the desired elevation (e.g., about the elevation of front roller 37).

The top roller 36 may form a front nip 67 with the front roller 37. The front and top rollers 36, 37 may be adapted to cooperate to move the string of packaging cushions 11 through the front nip 67 to the rear roller 39. The upper roller 38 may form a rear nip 69 with the rear roller 39. The upper and rear rollers 38, 39 may be adapted to cooperate to move the string of packaging cushions 11 through the rear nip 69.

Clip 86 may comprise magnet 96 adapted to oppose a metal member or portion 98 to clasp an object (e.g., deflated cushion 90) between the magnet 96 and the metal member 98. (FIG. 11.) Flap 100 may be attached to the belt 84. The magnet 96 may be attached to the flap 100 or may be attached to the endless belt 84 (as shown). The flap 100 may comprise the metal member or portion 98, the metal member 98 may be affixed to the flap 100, or the metal member may be affixed to the endless belt 84 opposite the magnet 96. The clip 86 may be attached to the belt 84 by a tether (not shown).

Air Conveyance

The system 8 may comprise one or more ducts through which the string of packaging cushions may be propelled by air conveyance. For example, an air-conveyance duct adapted to cooperate with one or more blowers to establish a propelling flow of air through the duct may be used in system 8 instead of or in conjunction with conveyor 20 and/or one or more of the conveyor sections. Such an air-conveyance duct may comprise multiple outlets for the string segments of packaging cushions.

Also by way of example, system 8 may comprise an air-conveyance duct adapted to cooperate with one or more blowers to establish a propelling flow of air through the duct to lift the string of packaging cushions from the manufactured outlet elevation 59 of cushion supply machine 10 to about the elevation of the inlet 21 of conveyor 20.

Air-conveyance ducts and systems useful for the air-conveyance of a string of packaging cushions are described in U.S. patent application Ser. No. 10/661,235 filed Sep. 12, 2003 (owned by the assignee of the present application), which is incorporated herein in its entirety by reference; and in U.S. Pat. No. 6,519,916 to Brown; U.S. Pat. No. 6,536,183 to Brown; and U.S. Pat. No. 6,453,644 to Baker, each of which is incorporated herein in its entirety by reference.

Operation

An operator may load the system 8 with a string of packaging cushions 11 using loader 80. To do so, the operator clips to clip 86 one end of the string of packaging cushions 11 that extends from machine 10. (FIG. 10.) If the cushions 55 are air-filled cushions, then the operator may deflate one of the cushions to form deflated cushion 90 (in which case it is no longer considered a "packaging cushion"), so that the leading end of the string of packaging cushions may be more easily attached to the belt 84 by clipping clip 86 to the deflated cushion 90. If clip 86 is attached to belt 84 by a tether (not shown), then the string of packaging cushions may be attached to the clip without deflating a cushion 55.

Belt 84 lifts the leading end of the string of packaging cushions 11 through nip 67. (FIG. 12.) The belt may be driven by front roller 37. In doing so, the belt 84 may pull the deflated cushion 90 around front roller 37 and between the front and rear rollers 37, 39. As the first packaging cushion passes through the front nip 67, the spacing of the front and rear rollers is such that it may obstruct the passage of the packaging cushion between the front and rear rollers. As the packaging cushion touches the rear roller 39 and continues through rear nip 69, the release tension is applied to the clip 86 attached to deflated cushion 90 so that the clip releases the deflated cushion and thus the string of packaging cushions. The string of packaging cushions continues through the front and rear nips.

Describing the operation of system 8 generally, if for example the farthest downstream hopper is to be filled first, all of the moveable conveyor sections are placed in the closed (in-line) position. When the farthest downstream hopper is filled, the sensors 31 sense the level in the hopper and signal the controller 50, which signals the separator 42 to separate the string of packaging cushions. After the end of the separated string of packaging cushions has passed a selected conveyor section, the controller signals the diverter 25 to move the selected conveyor section to a conveyor-section open position (FIG. 4) to create an intermediate outlet in conveyor 20. The beginning of the newly separated string of packaging cushions may then travel through the open intermediate outlet to fill the corresponding hopper. This procedure may be repeated to replenish each hopper.

Now describing the operation of system 8 in more detail, sensors 71 and 73 may send signals to the controller 50 regarding the position of the string of packaging cushions in the slack region 75. (FIG. 2.) If the string rises above the sensor 71, then the controller 50 may send a signal to one or more of the motors 48 to slow or stop the rotational speed of one or more of the rolls of roll assembly 35, in which case machine 10 may continue to manufacture cushions to rebuild the amount of slack in slack region 75, or the controller may send a signal to machine 10 to start or increase the speed of manufacture of the string of cushions to increase the amount of slack in the slack region.

If the string of packaging cushions 11 falls below sensor 73, then controller 50 may send a signal to one or more of the motors 48 to start or speed the rotational speed of the rolls, or may send a signal to machine 10 to stop or decrease the production speed, in which case the slack in the string will decrease in slack region 75. The slack in the string of packaging cushions may help to reduce the amount of tension in the string or "tugging" as it exits the machine 10, so that the amount of string tension or any tugging does not adversely affect the performance of machine 10 as it manufactures the string of packaging cushions.

After traveling through the roll assembly 35, when the system 8 is configured in a primary flow path configuration, the conveyor belts 33 of the conveyor 20 propel or convey the string of packaging cushions 11 from the conveyor inlet 21 along the passageway 128 past the closed intermediate outlets, and out the conveyor outlet 22 into the corresponding hopper 30.

The conveyor 20 may be elevated above the manufactured cushion outlet elevation 59 of the machine, for example by at least about 4 feet higher in elevation, to provide a more uncluttered plant floor and facilitate the floor access to and from the packing stations 40, for example, to allow room for floor conveyors to move product to and from the packing stations.

The sensors 31 of the hopper send signals to the controller 50 regarding the level of the cushions in the hopper 30. If, for example, the hopper is sensed as full, the system controller 50 may act to reconfigure the system flow path from the primary flow path to a first intermediate flow path in order to send a string of packaging cushions to another hopper. To do so, the controller 50 signals the separator 42 to move to the plunger engaged position so that the plunger 43 moves to separate the string of packaging cushions in region 65 into a leading string segment 77 and a trailing string of packaging cushions 79. In doing so, the controller may stop the front pair of rolls 36, 37, then subsequently stop the rear pair of rollers 38, 39 to provide a tension in the string of packaging cushions 11 in the region 65 to facilitate the separation of the string. Alternatively, the string of packaging cushions may continue to move as the plunger is engaged in coordinated fashion with the speed of string of packaging cushions to engage the string between cushions.

A sensor (not shown) may identify the location of perforations 57 and send that information to the controller, so that the controller may operate the rolls to align the perforations under or in the engagement path of the plunger 43 in order to make it easier for the plunger to cleanly separate the string of packaging cushions when the plunger moves to the engaged position.

After the plunger has separated the string of packaging cushions, it returns to the disengaged position. The rear pair of rollers may begin to rotate while the front pair of rollers remains stationary, so that the leading string segment travels onto the belts 33 and down the conveyor passageway 128 along the primary flow path, while the trailing string of packaging cushions remains immobile in the nip of the front pair of rolls. After a desired amount of gap has been created between the leading string segment 77 and the trailing string of packaging cushions 79, the front pair of roller may begin to rotate to move the trailing string through the pairs of rolls to the conveyor. The conveyor belts may rotate or travel slightly faster than the rotational speed of the pairs of rolls of the roll assembly 35, to help assure that the string of packaging cushions does not bunch up in the conveyor passageway.

The "newly created" leading string segment continues to travel along the primary flow path described above. After the conveyor has moved this leading string segment past the first intermediate outlet position, then the system 8 may be configured to establish a first intermediate flow path by moving the first moveable conveyor section to the first conveyor-section open position to create or open the first intermediate outlet. In this first intermediate flow path, the trailing string of packaging cushions travels along the conveyor from the conveyor inlet 21 through the open intermediate outlet 23. The string of packaging cushions then falls into the hopper 30 corresponding to the open first intermediate outlet.

After this hopper is filled to a desired level, the system controller 50 may act to reconfigure the flow path to a second intermediate flow path in order to send a string of packaging cushions to another hopper. To do so, the controller 50 signals the separator 42 to move the plunger to the engaged position so that the plunger 43 again moves to separate the string of packaging cushions in region 65 into a leading string segment 77 and a trailing string of packaging cushions 79, as discussed above. The "newly created" leading string segment continues to travel along the first intermediate flow path described above. After the conveyor has moved the complete leading string segment through the open first intermediate outlet, then the system 8 may be configured by controller 50 to establish the second intermediate flow path by moving the first moveable conveyor section to the first conveyor-section closed position to close the first intermediate outlet, and to move the second moveable conveyor section to the second-conveyor section open position to establish the second intermediate outlet. In this second intermediate flow path, the trailing string of packaging cushions travels along the conveyor from the conveyor inlet 21, past the closed first intermediate outlet position, and through the open second intermediate outlet 23. The string of packaging cushions then falls into the hopper 30 corresponding to the open second intermediate outlet.

The operation has been described above in a particular sequence for simplicity sake; however, as may be appreciated, the system may include additional intermediate flow paths and may operate in varying sequence between the flow paths. For example, the controller 50 may control the operation of the plunger and the moveable conveyor sections to switch between the various flow paths in coordinated sequence to deliver the string of packaging cushions along the desired flow path, for example, in response to the level of cushions in the corresponding hoppers.

The packing operator may withdraw a portion of the string of packaging cushions through the openings 150. The packing operator may manually separate the string into shorter string segments to be used in packing an article to be shipped. (FIG. 1.)

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for conveying a string of packaging cushions comprising:
   a machine capable of manufacturing the string of packaging cushions, wherein the machine defines a manufactured cushion outlet elevation;
   a transport conveyor adapted to transport the string of packaging cushions, the transport conveyor having an inlet end capable of receiving the string of packaging cushions and an outlet end capable of delivering the string of packaging cushions, wherein:
      the transport conveyor comprises two or more transport conveyor sections;
      at least one of the transport conveyor sections is adapted to be moveable between:
         a conveyor-section open position to create an intermediate outlet between the inlet and outlet ends of the transport conveyor and establish an intermediate flow path for the string of packaging cushions along the transport conveyor from the transport conveyor inlet end through the intermediate outlet; and
         a conveyor-section closed position in which the intermediate outlet is closed to establish a primary flow path for the string of packaging cushions past the intermediate outlet location; and
   a rotating member adapted to cooperate with the transport conveyor to propel the string of packaging cushions from the machine to the transport conveyor inlet end and between the rotating member and the transport conveyor.

2. The system of claim 1 wherein:
   the moveable at least one transport conveyor sections comprise a first moveable transport conveyor section and a second moveable transport conveyor section, wherein:
   the first moveable transport conveyor section is adapted to be moveable between:
      a first conveyor-section open position to create a first intermediate outlet between the inlet and outlet ends of the transport conveyor and establish a first intermediate flow path for the string of packaging cushions along the transport conveyor from the transport conveyor inlet through the first intermediate outlet; and
      a first conveyor-section closed position in which the first moveable transport conveyor section is closed so that the string of packaging cushions passes the first intermediate outlet position;
   the second moveable transport conveyor section is adapted to be moveable between:
      a second conveyor-section open position to create a second intermediate outlet between the inlet and outlet ends of the transport conveyor; and
      a second conveyor-section closed position in which the second moveable transport conveyor section is closed so that the string of packaging cushions passes the second intermediate outlet position;
   a second intermediate flow path for the string of packaging cushions along the transport conveyor from the transport conveyor inlet past the first intermediate outlet position and through the second intermediate outlet is established when the first moveable transport conveyor section is in the closed position and the second moveable transport conveyor section is in the open position;
   a primary flow path for the string of packaging cushions along the transport conveyor from the transport conveyor inlet past the first and second intermediate outlet positions is established when the first and second moveable transport conveyor sections are in the closed positions;
   the system further comprises:
   a separator moveable between an engaged position and a disengaged position, wherein in the engaged position the separator is adapted to separate the string of cushions into a leading string segment and a trailing string of packaging cushions; and
   a controller adapted to control the operation of the separator and the first and second moveable transport conveyor sections in coordinated sequence to deliver the string of packaging cushions along the desired primary, first intermediate, and second intermediate flow paths.

3. The system of claim 2 further comprising:
   a first hopper corresponding to the first intermediate outlet and adapted to receive a string of packaging cushions passing along the first intermediate flow path to establish a given level of cushions in the first hopper; and
   a second hopper corresponding to the second intennediate outlet and adapted to receive a string of packaging cushions passing along the second intermediate flow path to establish a given level of cushions in the second hopper; wherein:
   the controller is adapted to control the operation of the separator and the movement of the first and second moveable transport conveyor sections in coordinated sequence to deliver the string of packaging cushions along the desired primary, first intennediate, and second intermediate flow paths in response to the given levels of cushions in the first and second hoppers.

4. The system of claim 1 wherein the at least one of the transport conveyor sections comprises:
   an upstream end moveable to create the intermediate outlet; and
   a hingedly supported downstream end downstream from the upstream end of the at least one of the transport conveyor sections.

5. The system of claim 1 wherein the at least one of the transport conveyor sections comprises:
   a downstream end moveable to create the intermediate outlet; and
   a hingedly supported upstream end upstream from the downstream end of the at least one of the transport conveyor sections.

6. The system of claim 1 further comprising a separator moveable between an engaged position and a disengaged position, wherein in the engaged position the separator is adapted to separate the string of packaging cushions.

7. The system of claim 6 wherein the separator comprises a plunger member comprising a blunt end for engaging the string of packaging cushions.

8. The system of claim 6 wherein the separator comprises a plunger member comprising a sharp end for engaging the string of packaging cushions.

9. The system of claim 6 wherein in the engaged position the separator is adapted to separate the string of packaging cushions into a leading string segment and a trailing string of packaging cushions; the system further comprising:
a controller adapted to control the operation of the separator and the moveable at least one transport conveyor section in coordinated sequence to deliver the string of packaging cushions along the desired primary or intermediate flow paths.

10. The system of claim 9 wherein the controller is adapted to control the operation of the rotating member in coordinated sequence with the operation of the separator and the moveable at least one transport conveyor section.

11. The system of claim 9 wherein:
the at least one of the transport conveyor sections is moveable to the conveyor-section open position in response to a conveyor-section open signal;
the at least one of the transport conveyor sections is moveable to the conveyor-section closed position in response to a conveyor-section close signal;
the separator is moveable to the engaged position in response to a separator-engagement signal; and
the controller is adapted to send the separator engagement signal and the transport conveyor-section open and close signals in coordinated sequence so that the intennediate outlet is created or closed in time for a trailing string of packaging cushions to travel a flow path selected from the primary and intermediate flow paths.

12. The system of claim 1 wherein the rotating member comprises a top conveyor adapted to cooperate with the transport conveyor to propel the string of packaging cushions from the machine to the transport conveyor inlet end and between the transport conveyor and the top conveyor.

13. The system of claim 1 wherein the rotating member comprises at least one roll forming a nip between the roll and the transport conveyor and adapted to cooperate with the transport conveyor to propel the string of packaging cushions from the machine to the transport conveyor inlet end and through the nip.

14. The system of claim 13 wherein the at least one roll is adapted to deform as the string of packaging cushions passes through the nip.

15. The system of claim 14 wherein the at least one roll comprises resilient foam.

16. The system of claim 13 wherein the rotating member further comprises an endless belt encircling the at least one roll to form a top conveyor adapted to cooperate with the transport conveyor to propel the string of packaging cushions from the machine to the transport conveyor inlet end and between the transport conveyor and the top conveyor.

17. The system of claim 1 wherein the rotating member is adjacent the inlet end of the transport conveyor.

18. The system of claim 1 wherein the inlet end of the transport conveyor is at an elevation higher than the manufactured cushion outlet elevation.

19. The system of claim 1 wherein the inlet end of the transport conveyor is at least about 4 feet above the manufactured cushion outlet elevation.

20. The system of claim 1 wherein the transport conveyor comprises a plurality of conveyor belts.

21. A method of conveying a string of packaging cushions using the system of claim 1, the method comprising:
manufacturing a string of packaging cushions using the machine;
propelling the string of packaging cushions from the machine to the transport conveyor inlet and between the rotating member and the transport conveyor; and
transporting the string of packaging cushions along the transport conveyor.

22. The method of claim 21 wherein the string of packaging cushions comprises a string of air-filled dunnage cushions.

* * * * *